(12) United States Patent
Sheperek et al.

(10) Patent No.: US 11,704,217 B2
(45) Date of Patent: Jul. 18, 2023

(54) CHARGE LOSS SCAN OPERATION MANAGEMENT IN MEMORY DEVICES

(71) Applicant: Micron Technology, Inc., Boise, ID (US)

(72) Inventors: Michael Sheperek, Longmont, CO (US); Steven Michael Kientz, Westminster, CO (US); Shane Nowell, Boise, ID (US); Mustafa N. Kaynak, San Diego, CA (US); Kishore Kumar Muchherla, Fremont, CA (US); Larry J. Koudele, Erie, CO (US)

(73) Assignee: Micron Technology, Inc., Boise, ID (US)

( * ) Notice: Subject to any disclaimer, the term of this patent is extended or adjusted under 35 U.S.C. 154(b) by 47 days.

(21) Appl. No.: 17/157,220

(22) Filed: Jan. 25, 2021

(65) Prior Publication Data

US 2022/0237094 A1 Jul. 28, 2022

(51) Int. Cl.
*G06F 11/30* (2006.01)
*G06F 3/06* (2006.01)
*G06F 11/07* (2006.01)

(52) U.S. Cl.
CPC .......... *G06F 11/3037* (2013.01); *G06F 3/064* (2013.01); *G06F 3/0619* (2013.01); *G06F 3/0679* (2013.01); *G06F 11/076* (2013.01); *G06F 11/3058* (2013.01)

(58) Field of Classification Search
CPC .............. G06F 11/3037; G06F 11/076; G06F 11/3058; G06F 3/064; G06F 3/0619; G06F 3/0679
See application file for complete search history.

(56) References Cited

U.S. PATENT DOCUMENTS

| | | | |
|---|---|---|---|
| 10,339,983 B1* | 7/2019 | Confalonieri | G11C 13/0033 |
| 10,998,041 B1* | 5/2021 | Avraham | G11C 16/26 |
| 2010/0153680 A1* | 6/2010 | Baum | G11B 5/5565 |
| | | | 711/E12.002 |
| 2017/0364263 A1* | 12/2017 | Lublin | G06F 12/02 |
| 2019/0354312 A1* | 11/2019 | Chew | G06F 3/0679 |
| 2020/0117387 A1* | 4/2020 | Cadloni | G06F 3/0604 |
| 2021/0263821 A1* | 8/2021 | Yang | G11C 29/028 |

* cited by examiner

*Primary Examiner* — Jigar P Patel
(74) *Attorney, Agent, or Firm* — Lowenstein Sandler LLP

(57) ABSTRACT

A memory system includes a memory device and a processing device, operatively coupled to the memory device. The processing device performs operations comprising: identifying an operating temperature of the memory device; determining that the operating temperature satisfies a temperature condition; modifying a scan frequency parameter for performing a scan operation on representative blocks of a set of blocks in the memory device; and performing the scan operation at a frequency identified by the scan frequency parameter.

17 Claims, 10 Drawing Sheets

Superblock Table 510

| SuperBlock | Partition | Times Hr | Temp | Family |
|---|---|---|---|---|
| 0 | 0 | 10 | 31 | 4 |
| 0 | 1 | 11 | 35 | 5 |
| 0 | 2 | 11 | 50 | 20 |
| ... | ... | ... | ... | ... |
| 0 | 31 | | | 20 |
| 1 | 0 | | | 21 |
| 1 | 1 | | | 0 |
| 1 | 2 | | | 0 |
| 1 | 3 | | | 0 |
| ... | ... | | | ... |
| 1 | 30 | | | |
| 1 | 31 | | | |
| ... | ... | | | |
| 745 | 29 | | | 22 |
| 745 | 30 | | | 0 |
| 745 | 31 | | | 0 |

Family Table 520

| Index | Die 0 bin | Die 1 bin | ... | Die N bin |
|---|---|---|---|---|
| 1 | 5 | 6 | | 4 |
| 2 | 4 | 2 | | 5 |
| 3 | | | | |
| 4 | 3 | | | |
| 5 | | | | |
| ... | | | | |
| 20 | | | | |
| 21 | | | | |
| 22 | | | | |
| ... | | | | |
| 62 | | | | |
| 63 | | | | |
| 64 | | | | |

Offset table 530

| Bin | TLC1 | TLC2 | TLC3 | TLC4 | TLC5 | TLC6 | TLC7 | MLC1 | MLC2 | MLC3 | SLC |
|---|---|---|---|---|---|---|---|---|---|---|---|
| 1 | 0 | 1 | 1 | -1 | -1 | -2 | -4 | 0 | 2 | 2 | 2 |
| 2 | | | | | | | | | | | |
| 3 | | | | | | | | | | | |
| ... | | | | | | | | | | | |
| 64 | | | | | | | | | | | |

810 Identify a plurality of temperature ranges, wherein each temperature range comprises a starting temperature and an ending temperature

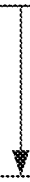

820 Associate each temperature range to a respective scan condition for performing a block family (BF) scan operation on blocks of a BF in a memory device

830 Identify an operating temperature of the memory device

840 Determine that the operating temperature is within a particular temperature range of the plurality of temperature ranges

850 Responsive to determining that a specified scan condition is satisfied, perform the BF scan operation, wherein the specified scan condition corresponds to the particular temperature range

CHARGE LOSS SCAN OPERATION MANAGEMENT IN MEMORY DEVICES

TECHNICAL FIELD

Embodiments of the disclosure are generally related to memory sub-systems, and more specifically, related to charge loss scan operation management in memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of some embodiments of the disclosure.

FIG. 5 schematically illustrates example metadata maintained by the memory sub-system controller for associating blocks with block families, in accordance with embodiments of the present disclosure.

FIG. 8 is a flow diagram of an example method of managing a block family scan operation based on operating temperature of a memory device, in accordance with some embodiments of the disclosure.

DETAILED DESCRIPTION

Figure 1:
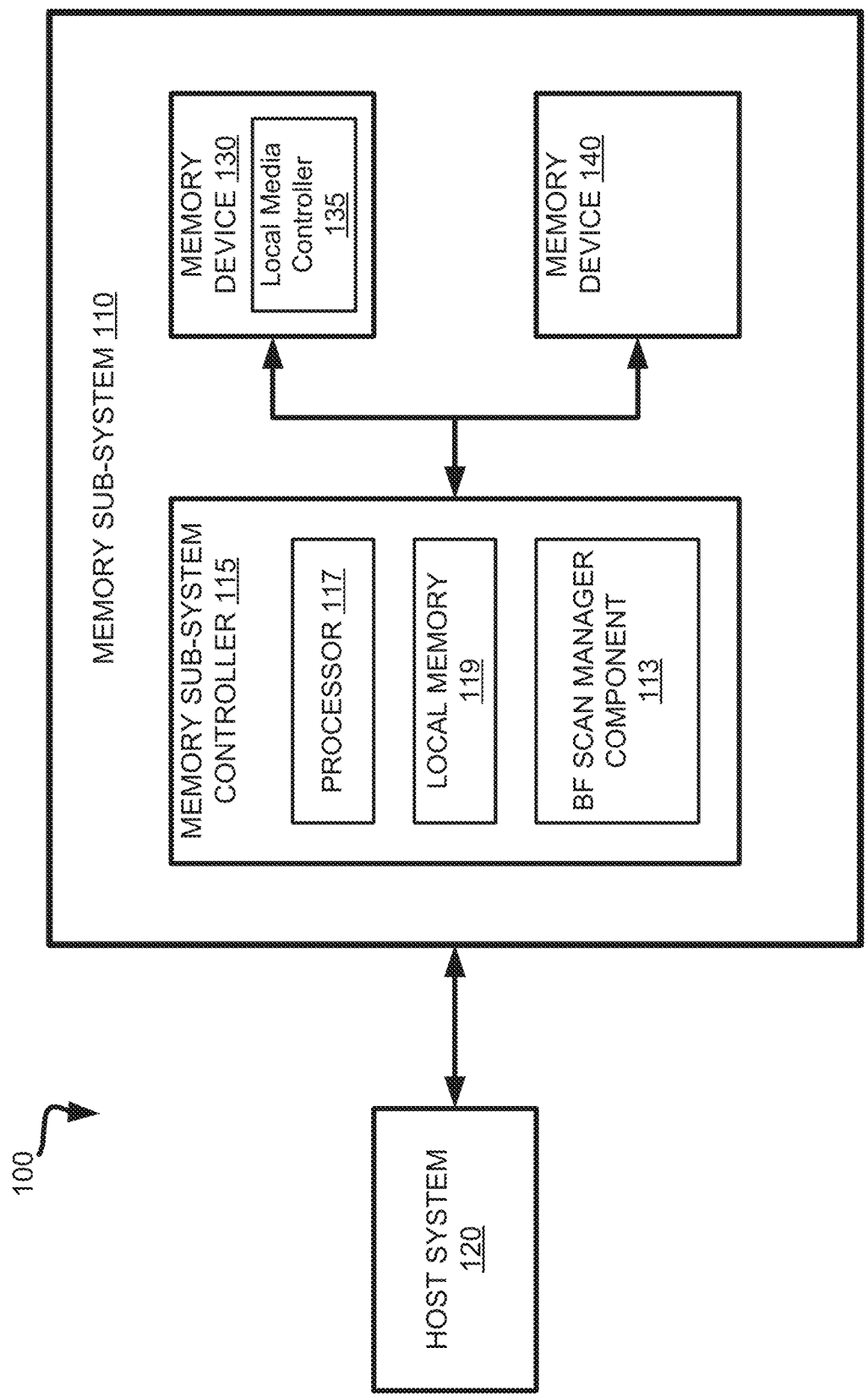
FIG. 1 illustrates an example computing system that includes a memory sub-system, in accordance with some embodiments of the disclosure.

Embodiments of the disclosure are directed to charge loss scan operation management in memory devices. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by negative-and (NAND) type flash memory devices. Other examples of non-volatile memory devices are described below in conjunction with FIG. 1. A non-volatile memory device is a package of one or more die. Each die can consist of one or more planes. Planes can be groups into logic units (LUN). For some types of non-volatile memory devices (e.g., NAND devices), each plane consists of a set of blocks. A "block" herein refers to a set of contiguous or non-contiguous memory pages. An example of a block is an erasable block, which is a minimal erasable unit of memory, while a page is a minimal writable unit of memory. Each page includes a set of memory cells ("cells"). A cell is an electronic circuit that stores information.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. The data to be read or written, as specified by a host request, hereinafter is referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error correction code (ECC) codeword, parity code), data version (e.g., used to distinguish age of data written), valid bitmap (which LBAs or logical transfer units contain valid data), block family information, and the like.

A memory device includes multiple memory cells, each of which can store, depending on the memory cell type, one or more bits of information. A memory cell can be programmed (written to) by applying a certain voltage to the memory cell, which results in an electric charge being held by the memory cell, thus allowing modulation of the voltage distributions produced by the memory cell. Moreover, precisely controlling the amount of the electric charge stored by the memory cell allows to establish multiple threshold voltage levels corresponding to different logical levels, thus effectively allowing a single memory cell to store multiple bits of information: a memory cell operated with $2^n$ different threshold voltage levels is capable of storing n bits of information. Thus, the read operation can be performed by comparing the measured voltage exhibited by the memory cell to one or more reference voltage levels in order to distinguish between two logical levels for single-level cells and between multiple logical levels for multi-level cells.

Due to the phenomenon known as slow charge loss ("SCL"), the threshold voltage of a memory cell changes in time as the electric charge of the cell is degrading, which is referred to as "temporal voltage shift" (TVS), since the degrading electric charge causes the voltage distributions to shift along the voltage axis towards lower voltage levels. TVS herein shall refer to a change in the measured voltage of cells as a function of time. Slow charge loss is a function of time, temperature, Program Erase Cycles (e.g., erasing and re-programming of memory), etc. The threshold voltage changes rapidly at first (immediately after the memory cell was programmed), and then slows down in an approximately logarithmic linear fashion with respect to the time elapsed since the cell programming event. Slow charge loss can also increase with increasing temperature of memory cells, increasing program erase cycles, higher program voltages, among other factors. TVS can include different components such as intrinsic charge loss, system charge loss, quick charge loss, etc. Replacement Gate (RG) NAND generally exhibits more TVS than floating gate NAND. TVS also shows significant die-to-die variation. Failure to mitigate the temporal voltage shift caused by the slow charge loss can result in the increased raw bit error rate (or RBER) in read operations.

Temporal voltage shift can be mitigated by implementing a memory sub-system that employs block family ("BF") based error avoidance strategies, thus significantly improving the bit error rate exhibited by the memory sub-system. In accordance with embodiments of the present disclosure, the temporal voltage shift is selectively tracked for a programmed set of memory cells grouped by block families. "Read level" herein shall refer to a voltage position. "Read level value" herein shall refer to a voltage or DAC value representing a voltage that that is applied to the read element (often, the control gate for a NAND cell) for purposes of reading that cell. "Base read level" herein shall refer to the initial threshold voltage level exhibited by the memory cell immediately after programming or upon expiration of a predetermined time after programming. In some implementations, base read levels can be stored in the metadata of the memory device. "Read level offset" herein shall refer to a component of the equation that determines the read level value. Appropriate voltage read level offsets, which are based on block affiliation with a certain block family, are applied to the base read levels to perform read operations. "Block family" herein shall refer to a possibly noncontiguous set of memory cells (which can reside in one or more full and/or partial blocks, the latter referred to as "partitions" herein) that have been programmed within a specified time window and a specified temperature window, and thus are expected to exhibit similar or correlated changes in their respective data state metrics. "Data state metric" herein shall refer to a quantity that is measured or inferred from the state of data stored on a memory device. Specifically, the data state metrics may reflect the state of the temporal voltage shift, the degree of read disturb, and/or other measurable functions of the data state. A composite data state metric is a function (e.g., a weighted sum) of a set of component state metrics.

Block families can be created asynchronously with respect to block programming events. In an illustrative example, a new block family can be created whenever a specified period of time (e.g., a predetermined number of minutes) has elapsed since creation of the last block family or the reference temperature of memory cells has changed by more than a specified threshold value. The memory sub-system controller can maintain an identifier of the active block family, which is associated with one or more blocks as they are being programmed.

A block family may be made with any granularity, containing only whole codewords, whole pages, whole super pages, or whole superblocks, or any of their combinations. Since the time elapsed after programming and temperature are the main factors affecting the temporal voltage shift, all blocks and/or partitions within a single block family are presumed to exhibit similar distributions of threshold voltages in memory cells, and thus would require the same voltage offsets to be applied to the base read levels for read operations. Furthermore, blocks within a block family would have similar numbers of program-erase cycles (PEC) due to wear-leveling.

"Bin" (or "voltage bin" or "voltage offset bin") herein shall refer to a set of read level offsets that are applied to a set of data. The bin offsets are read level offsets that affect the read level for block families within the bin. An old or older bin is one where the read level offsets are directed at data that was written at a relatively early time. A young or younger bin is one where the read level offsets are directed at data written relatively recently. "Bin selection" herein shall refer to the process by which the memory device selects which bin to use for a given read. Each block family is associated with a set of dies on which blocks of the block family are stored. The association of a block family and dies with voltage bins can be represented by a set of bin pointers that includes a bin pointer for each die of the block family. For a particular block family, each particular die is associated with a bin pointer that identifies ("points to") a voltage bin, thereby establishing an association between the block family and the voltage bin for the particular die. Bins can be identified by bin numbers (e.g., numbers between 0 and N−1 in an N voltage bin architecture). Each bin pointer can thus be a bin number. The associations of blocks with block families and block families and dies with voltage bins can be stored in respective metadata tables maintained by the memory sub-system controller (e.g., as bin numbers in the metadata tables).

Due to the fact that block families are drifting over time with respect to the threshold voltage offset value, the controller can periodically perform a "block family scan," or "BF scan," of the memory cells of the memory device to evaluate a data state metric (e.g., to measure TVS levels) and if necessary, perform a calibration process to update the associations between block families and bins based on the measured TVS levels. The BF scan can involve performing, with respect to a specified number of randomly selected representative blocks within the block family that is being scanned, read operations utilizing different threshold voltage offsets to identify the threshold voltage offset that minimizes the error rate of the read operation.

"Calibration" herein shall refer to the process of altering a read level value (possibly by adjusting a read level offset or read level base) to better match the ideal read levels for a read or set of reads. If the BF scan indicates it is necessary to adjust the read level, the calibration process can then update a bin pointer associated with the die and block family to point to a voltage bin that corresponds to the measured value of the data state metric. Each voltage bin is associated with a voltage offset to be applied for read operations. For example, the bin pointer can remain the same if the measured data state metric is in a range associated with the existing bin pointer, or can be changed to point to an older bin if the measured data state metric is in a range associated with the older bin.

BF scans are performed periodically to ensure that read error is minimized at any given time by performing the scans frequently enough to identify the appropriate time to assign the BF to a new voltage bin. Generally, the temporal voltage shift for younger block families (i.e., block families that are more recently created) is more significant than the temporal voltage shift for older block families (i.e., block families that are less recently created). The memory sub-system controller can periodically perform the BF scan for each block family based on the age of the block family, which corresponds to the voltage bin associated with the block family. For example, in an N voltage bin architecture, newly created block families can be associated with voltage bin 0, while the oldest (i.e., least recently created) block families are associated with voltage bin N−1. Because of the logarithmic linear nature of SCL, block families stay in earlier bins (e.g., bin 0, etc.) for a shorter duration of time than while the block families stay in later bins (e.g., bin N−1, etc.) for a longer duration. The shorter the block family stays in a bin, the faster the need for performing BF scan to determine whether the block family needs to be calibrated to move to the next bin. Thus, the memory sub-system controller performs the BF scan for the block families in earlier bins (e.g., voltage bin 0) more frequently than for the block families in later bins (e.g., voltage bin N−1).

Additionally, as block families age, the temporal voltage shifts for temporally adjacent block families (i.e., block families that are adjacent in the block family creation order) can converge. Since metadata tables maintained by the memory sub-system controller can have a finite amount of space to store records associated with different block families, a memory sub-system controller can combine multiple active block families into a single block family. The memory sub-system controller can perform a BF scan to identify active block families that are candidates for combination.

Since the BF scan involves obtaining measurements of a current state of data at each scanned block family and performing calculations based on the measured state data, the BF scan can utilize a significant amount of memory sub-system resources. BF scan also involves performing read operations on representative blocks, using up valuable resources. As a result, when the memory sub-system performs BF scans, host requests can be delayed, especially when the BF scan is being performed on the same block that the host read request is directed to. Thus, when the BF scan is performed too frequently, it can increase latency and power consumption of the memory sub-system and decrease overall system performance. On the other hand, the BF scan is time-sensitive, because miscalibration can occur when bin pointers associated with a block family are not updated in a timely manner to compensate for the temporal voltage shift of data stored in blocks associated with the block family. Such miscalibration can result in read errors that can adversely affect the memory sub-system's performance. The read error can reach a high enough rate where an error control operation fails to correct the read error, such that an error recovery flow needs to be employed to recover the read error that took place, which also uses up additional computing resources and increases latency. Thus, performing BF scans too infrequently also hinders system performance.

As noted herein above, slow charge loss ("SCL") is a function of time and temperature. SCL can increase with increasing temperature and decrease with decreasing temperature. When the temperature remains low, the charge loss can be also low. When the temperature is high, the charge loss can be high in return. For example, if over a week, a memory device remains close to 0° C., the slow charge loss can be around 20-50 millivolts (mV), while if the memory device is around 100° C., the slow charge loss can be around 400 mV, a significant difference. Accordingly, a block family remains in a particular voltage bin longer at a lower temperature than it does at a higher temperature, and in turn the calibration process is performed less frequently to move the block family to a different bin. However, when the a BF scan frequency designed for use at a higher temperature is used at a lower temperature, then the memory sub-system performs BF scans more frequently than necessary for timely calibration, performing more read operations for the BF scan than necessary and causing performance reduction. Similarly, when the BF scan frequency designed for use at a lower temperature is used at a higher temperature, then the memory sub-system performs BF scans less frequently and can miss performing the calibration on time, resulting to higher error rates and performance reduction.

Aspects of the present disclosure address the above and other deficiencies by adjusting the BF scan operation to account for variation in operating temperature of the memory sub-system. The memory sub-system can identify a nominal temperature at which the memory device is expected to operate. In some implementations, a threshold temperature range can be defined, with a threshold starting temperature and a threshold ending temperature for the range. The memory sub-system can define the initial BF scan frequency for each bin corresponding to the nominal temperature, and/or the threshold temperature range. The memory sub-system can identify the duration of time a block family stays in a bin at the nominal temperature, which is referred to herein as "bin duration". For example, the bin duration can be identified as one hour for a particular bin (e.g., bin 0). The BF scan is performed more frequently than once per the bin duration, in order to ensure a change in the measured data state metric necessitating a bin change is detected before too much time has passed. For example, with a bin duration of one hour for bin 0, the BF scan is to be performed more than once per hour, or, at least twice per hour, for bin 0.

The memory sub-system can periodically check the operating temperature of the memory device. One or more temperature sensors can be used to measure the operating temperature. The memory sub-system can determine whether the operating temperature of the memory device is within the threshold temperature range. When the operating temperature is below the threshold starting temperature, the slow charge loss decreases. Accordingly, the memory sub-system can reduce the BF scan frequency. Similarly, if the operating temperature is detected to be above the threshold ending temperature, the slow charge loss is accelerated and necessitates more frequent BF scanning. Accordingly, the memory sub-system can increase the BF scan frequency. For example, the BF scan frequency can be modified using a predefined function, such as, a function based on temperature deviation from the threshold temperature range.

In some implementation, memory sub-system can define a number of temperature ranges in addition to the threshold temperature range. For example, the memory sub-system can identify an operating temperature spectrum that includes the highest temperature and the lowest temperature at which the memory device can practically be expected to operate. The operating temperature spectrum can be divided in a number of temperature regions. Each temperature region can have a predefined range of temperature values, including a start temperature and an end temperature for the range. The temperature ranges do not overlap with one another. In some examples, each range can be of the same size, such that the difference between the start temperature and end temperature is same across each range. In some examples, the ranges can be of different sizes. The memory sub-system can associate each temperature range with a predefined scan frequency value for each voltage bin. Higher temperature ranges can be associated with higher frequency values, and lower the temperature ranges can be associated with lower frequency values. The frequency values can be selected based on the duration of time a block family stays at a voltage bin (e.g., bin duration) for that temperature range. The memory sub-system can identify which particular range the operating temperature falls within. The memory sub-system can then modify the BF scan frequency parameter according to the predefined scan frequency value corresponding to the particular temperature range where the operating temperature falls within.

The memory sub-system performs the BF scan operation at the modified frequency value by performing read operations using representative blocks of the block family. When the memory sub-system identifies that a data state metric associated with the representative block indicates that a different read offset level is more appropriate, then the calibration process can be performed to change the bin pointer associated with a block family of a die to the next bin.

Therefore, advantages of the systems and methods implemented in accordance with some embodiments of the disclosure include, but are not limited to, improving system performance and accuracy by adjusting the block family scan operations to account for operating temperature variations. BF scans involve performing read operations and various calculations, which can delay host requests and use valuable system resources. Thus more frequent BF scans than necessary can lead to reduced performance. When bin pointers are not updated in a timely manner, it can result in high levels of read errors, as well as involve additional operations to resolve error handling. Thus less frequent BF scans than necessary can lead to inaccuracy in terms of higher RBER and reduced performance. Using temperature adaptive BF scan operations disclosed herein, the memory sub-system is able to perform calibration at low frequencies at lower temperatures to maintain appropriate read level, and perform calibration at high frequencies (with low latencies) during times of higher demand for calibration in higher temperatures, so that bin pointers can more accurately reflect the faster rate of charge loss at higher temperatures. Thus, by adjusting the BF scan frequency based on temperature variation, the memory sub-system can reduce the amount of processing time used by the BF scan when high-frequency scans are not needed, while retaining the benefits of high-frequency scans when needed. Interruptions during host requests are reduced as a result of not scanning a block while a host request is being performed.

FIG. 1 illustrates an example computing system 100 that includes a memory sub-system 110 in accordance with some embodiments of the disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device (e.g., a processor).

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DEV IM socket interface that supports Double Data Rate (DDR)), Open NAND Flash Interface (ONFI), Double Data Rate (DDR), Low Power Double Data Rate (LPDDR), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point array of non-volatile memory cells and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the disclosure, a memory sub-system 110 does not include a controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

In some implementations, memory sub-system 110 can use a striping scheme, according to which every the data payload (e.g., user data) utilizes multiple dies of the memory devices 130 (e.g., NAND type flash memory devices), such that the payload is distributed through a subset of dies, while the remaining one or more dies are used to store the error correction information (e.g., parity bits). Accordingly, a set of blocks distributed across a set of dies of a memory device using a striping scheme is referred herein to as a "super-block."

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a BF scan manager component 113 that can be used to implement charge loss scan operation management, in accordance with embodiments of the disclosure. In some embodiments, the controller 115 includes at least a portion of the BF scan manager component 113. For example, the controller 115 can include a processor 117 (processing device) configured to execute instructions stored in local memory 119 for performing the operations described herein. In some embodiments, the BF scan manager component 113 is part of the host system 120, an application, or an operating system. The BF scan manager component 113 can manage BF scan frequencies associated with block families in particular bins for the memory devices 130, as described in more detail herein below.

Figure 2:
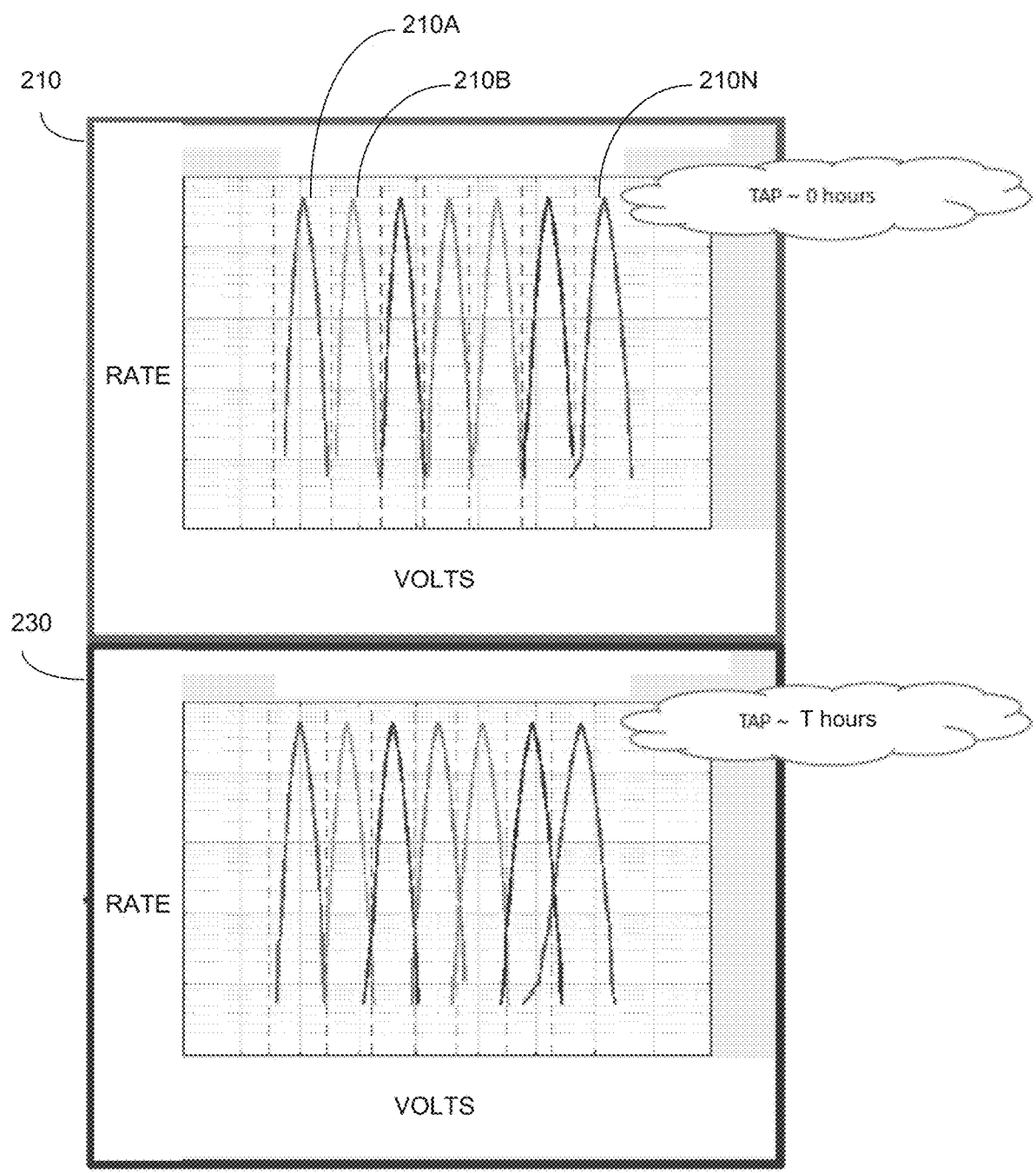
FIG. 2 illustrates the temporal voltage shift caused at least in part by the slow charge loss exhibited by triple-level memory cells, in accordance with embodiments of the disclosure.

FIG. 2 is a set of graphs that illustrate a temporal voltage shift caused by the slow charge loss exhibited by triple-level memory cells, in accordance with some embodiments. While the illustrative example of FIG. 2 utilizes triple-level cells, the same observations can be made and, accordingly, the same remedial measures are applicable to other types of memory cells that can store any number of bits per cell, such as, single level cells (SLC), quad-level cells (QLC), multi-level cells (MLC), etc. in order to compensate for the slow charge loss.

As noted herein above, a memory cell can be programmed (written to) by applying a certain voltage to the memory cell, which results in an electric charge being held by the memory cell, thus allowing modulation of the voltage distributions produced by the memory cell. Precisely controlling the amount of the electric charge stored by the memory cell allows to establish multiple threshold voltage levels corresponding to different logical levels, thus effectively allowing a single memory cell to store multiple bits of information: a memory cell operated with $2^n$ different threshold voltage levels is capable of storing n bits of information.

In FIG. 2, each graph illustrates a voltage distribution produced by memory cells programmed by a respective write level (which can be assumed to be at the midpoint of the distribution) to encode a corresponding logical level ("000" through "111" in case of a TLC). In order to distinguish between neighboring distributions (corresponding to two different logical levels), the threshold voltage levels (shown by dashed vertical lines) are defined, such that any measured voltage that falls below a threshold level is associated with one distribution of the pair of neighboring distributions, while any measured voltage that is greater than or equal to the threshold level is associated with another distribution of the pair of neighboring distributions.

The set of a graphs include a first graph 210 that reflects a time period immediately after programming and a second graph 230 that reflects a long time after programming. As seen by comparing the second graph 230 to the first graph 210, the voltage distributions change in time due to the slow charge loss, which results in drifting values of the threshold voltage levels (shown by dashed vertical lines). In various embodiments, this temporal voltage shift (TVS) is selectively tracked for programmed pages or blocks grouped by block families, and appropriate voltage offsets, which are based on page or block affiliation with a certain block family, are applied to the base read levels in order to perform read operations.

Figure 3:
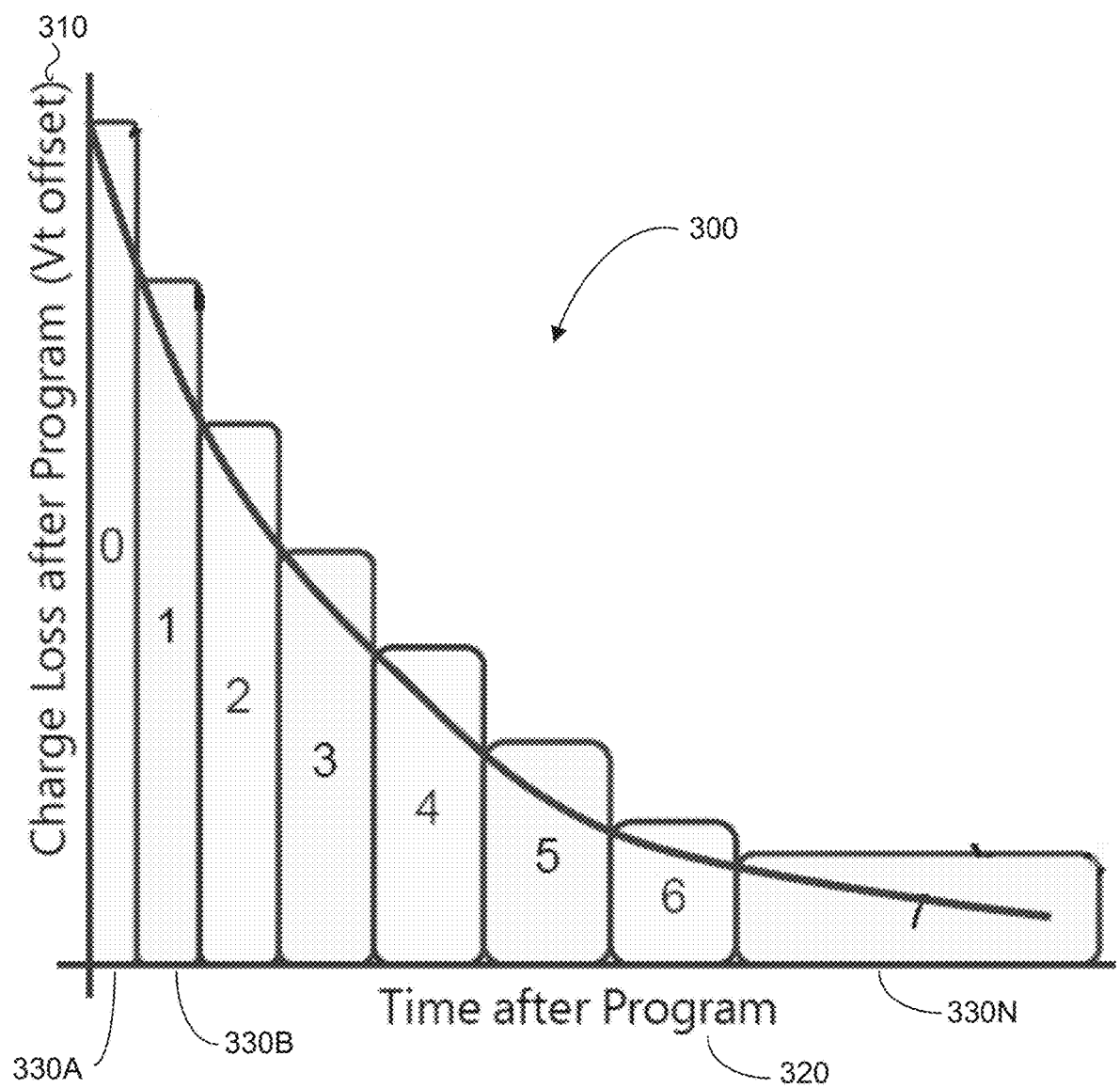
FIG. 3 is an example graph illustrating the dependency of a threshold voltage offset on the time after program, e.g., the time since a cell has been written, in accordance with some embodiments of the disclosure.

FIG. 3 is an example graph 300 illustrating the dependency of a threshold voltage offset 310 on the time after program 320, e.g., the period of time elapsed since a cell has been written (e.g., programmed), in accordance with some embodiments. As schematically illustrated by FIG. 3, pages or blocks (or groups of memory cells at another granularity) of the memory device are grouped into block families 330A-330N, such that each block family includes one or more pages or blocks that have been programmed within a specified time window (or window of time), potentially varied by aggregate temperature and/or PEC while the block family is open. As noted herein above, since the time elapsed after programming and temperature are the main factors affecting the temporal voltage shift, all pages, blocks, and/or partitions within a single block family are presumed to exhibit similar distributions of threshold voltages in memory cells, and thus would require the same voltage offsets for read operations as time passes.

Block families can be created asynchronously with respect to page programming events. In an illustrative example, the memory sub-system controller 115 of FIG. 1 can create a new block family whenever a specified period of time (e.g., a predetermined number of minutes) has elapsed since creation of the last block family, which time period can vary significantly depending on an aggregate temperature and/or PEC associated with pages during programming. More specifically, the entire asymptotic curve illustrated in FIG. 3 can be shifted to have a steeper curve with respect to time as aggregate temperature and/or PEC increases. Slow charge loss is illustrated along the vertical access for the seventh valley (V7) based on digital-to-analog (DAC) converted voltage values, also referred to as DACs. Each DAC can represent a certain number of millivolts (mV), here about 10 mV by way of example.

A newly created block family can be associated with bin 0, and each subsequently created block family can be associated with a sequentially numbered block family. Then, the memory sub-system controller can periodically perform a calibration process in order to associate each die of every block family with one of the predefined threshold voltage offset bins (e.g., bins 0-7 in the illustrative example of FIG. 3), which is in turn associated with the voltage offsets to be applied for read operations. The associations of pages, blocks, and/or partitions with block families and block families and dies with threshold voltage offset bins can be stored in respective metadata tables maintained by the memory sub-system controller 115.

Figure 4A:
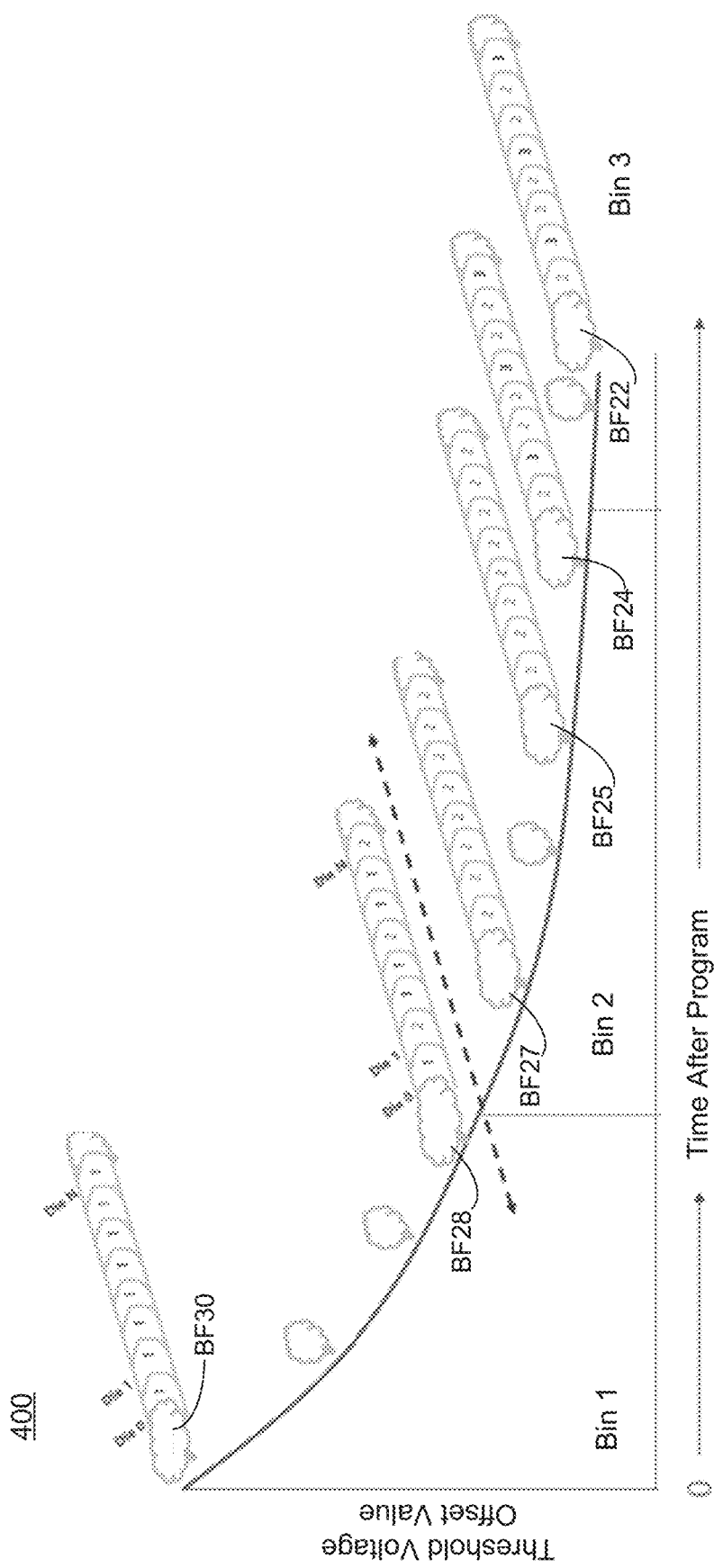
FIG. 4A is a graph illustrating how block families exist in a particular threshold voltage offset bin, which depends on time after program (TAP) in accordance to an embodiment.
Figure 4B:
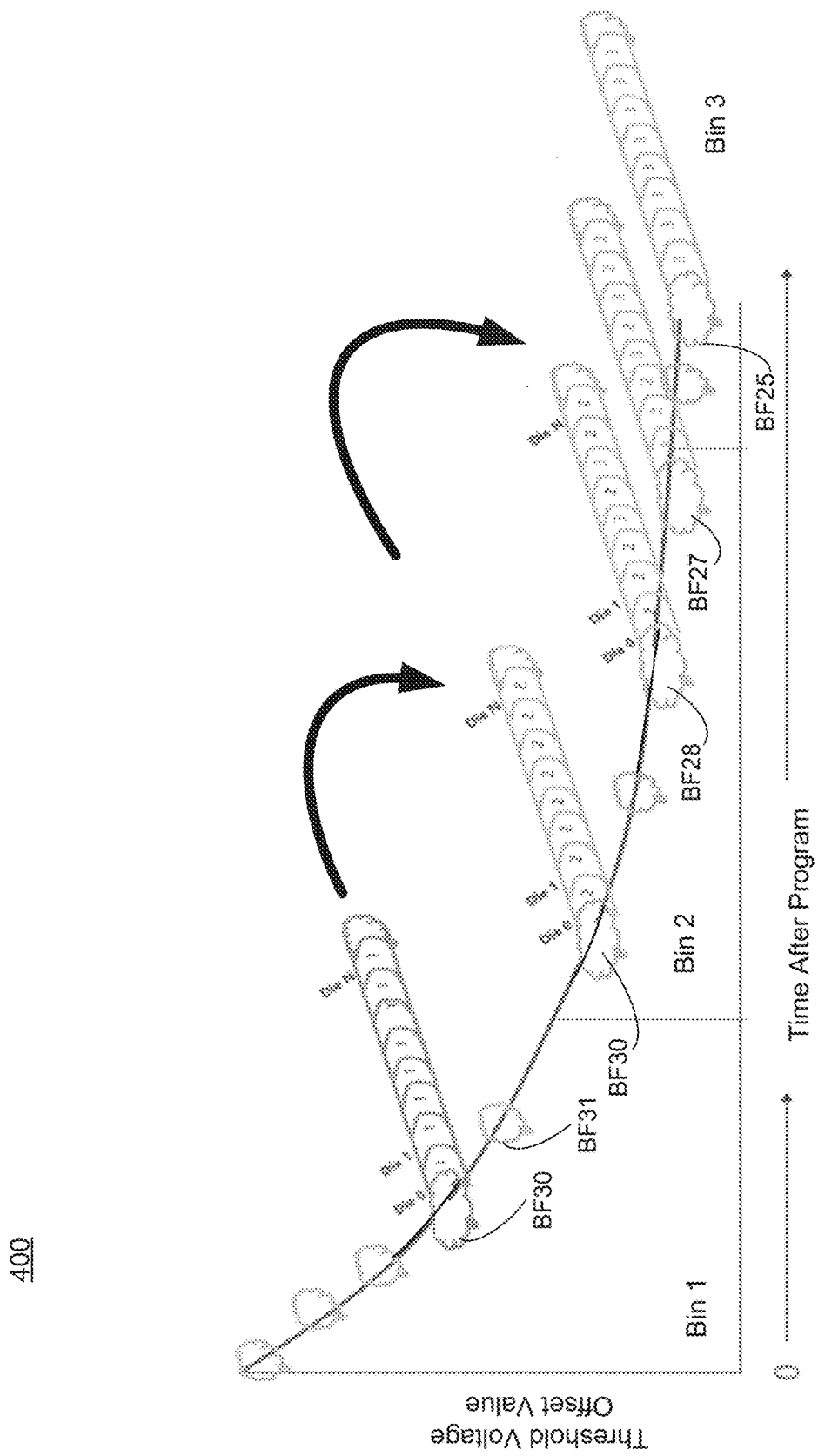
FIG. 4B is a graph illustrating how block families move to the right with increasing time after program (TAP) in accordance with an embodiment.

FIG. 4A is a graph 400 illustrating how block families exist in a particular threshold voltage offset bin, which depends on time after program (TAP) in accordance to an embodiment. FIG. 4B is the graph 400 illustrating how block families change their respective voltage offset bins with increasing time after program (TAP) in accordance with an embodiment. In the example embodiment of FIG. 4A, block families (BFs) are created in the first threshold voltage offset bin (Bin 1 for short), and age over time to transition to being associated with a subsequent threshold voltage offset bin. The drift in TVS (which is along the Y axis in the graph 400) starts more quickly with respect to TAP and thus has a steeper curve at first and slows down later, leveling out this curve.

As illustrated in FIG. 4A, BF28 is identified as the oldest (i.e., the least recently created) block family in Bin 1 because at least a part of the data in BF28 is still within the time after program (TAP) defined by Bin 1. Further, BF30 has just been created (e.g., closed as a BF) and is the youngest (i.e., the most recently created) block family in Bin 1. Similarly, BF27 is identified as the youngest block family in the second threshold voltage offset bin (Bin 2) and BF24 as the oldest block family in Bin 2. Further, BF22 is old enough to reside now in the third threshold voltage offset bin (Bin 3). While many threshold voltage offset bins can exist, the embodiment of FIG. 4A illustrates three bins solely for purposes of explanation, each of which is associated with one or more threshold voltage offset values.

As is evidenced in FIG. 4B, the block families generally drift in threshold voltage offset over time, where BF28 and BF30 are both now in Bin 2, BF25 is in Bin 3, and new block families BF31 and younger BFs are located in Bin 1. Due to the fact that block families are drifting over time with respect to the threshold voltage offset value, the controller can perform a scan of the memory cells of the memory device (e.g., to measure TVS levels) and a resynchronization of pointers of the block families based on the measured TVS levels. The scan can be referred to as a block family scan, or BF scan. The scan can involve performing, with respect to a specified number of randomly selected blocks within the block family that is being scanned, read operations utilizing different threshold voltage offsets to select the threshold voltage offset that minimizes the error rate of the read operation. The randomly selected blocks can be representative of blocks in the block family. The scanning can be limited to the block families that exist at the boundaries (e.g., oldest block family) between threshold voltage offset bins (e.g., BF24 and BF28 as viewed in FIG. 4A) and are thus anticipated to be the first to move into a new bin. Depending on frequency of scanning, one or more BFs that have recently transitioned into new bins can also be measured and their bin pointers resynchronized.

A calibration process can be periodically performed to resynchronize the bin pointers. "Calibration" herein shall refer to altering a read level value (possibly by adjusting a read level offset or read level base) to better match the ideal read levels for a read or set of reads. Resynchronization of pointers refers to updating pointers between metadata tables that tell the controller 115 which threshold voltage offset bin to use for which block families and thus, ultimately, which threshold voltage offset values to apply for which block families. The BF scan is performed at a frequency that is higher than the frequency of performing the calibration process on an average for each bin, such that changes in TVS level requiring a move to the new bins can be detected before too much time has passed since the changes in the TVS level has taken place. The BF scan frequency can be defined based on how long a block family stay in each bin on an average. The duration of time a block family stays in a particular bin on an average is referred to as "bin duration" herein. The BF scan is performed more frequently than once per the bin duration. The memory sub-system can use a BF scan frequency parameter to perform the BF scan operation periodically. The BF scan frequency parameter can be modified to change the frequency of the BF scan operation when necessary.

FIG. 5 schematically illustrates example metadata maintained by the memory sub-system controller for associating blocks with block families, in accordance with embodiments of the present disclosure. As schematically illustrated by FIG. 5, the memory sub-system controller can maintain the superblock table 510, the family table 520, and the offset table 530.

Each record of the superblock table 510 specifies the block family associated with the specified superblock and partition combination. In some implementations, the superblock table records can further include time and temperature values associated with the specified superblock and partition combination.

The family table 520 is indexed by the block family number, such that each record of the family table 520 specifies, for the block family referenced by the index of the record, a set of threshold voltage offset bins associated with respective dies of the block family. In other words, each record of the family table 520 includes a vector, each element of which specifies the threshold voltage offset bin associated with the die referenced by the index of the vector element. The threshold voltage offset bins to be associated with the block family dies can be determined by the calibration process, as described in more detail herein above.

Finally, the offset table 530 is indexed by the bin number. Each record of the offset table 730 specifies a set of threshold voltage offsets (e.g., for TLC, MLC, and/or SLC) associated with threshold voltage offset bin.

The metadata tables 510-530 can be stored on one or more memory devices 130 of FIG. 1. In some implementations, at least part of the metadata tables can be cached in the local memory 119 of the memory sub-system controller 115 of FIG. 1.

In operation, upon receiving a read command, the memory sub-system controller determines the physical address corresponding to the logical block address (LBA) specified by the read command. Components of the physical address, such as the physical block number and the die identifier, are utilized for performing the metadata table walk: first, the superblock table 510 is used to identify the block family identifier corresponding to the physical block number; then, the block family identifier is used as the index to the family table 520 in order to determine the threshold voltage offset bin associated with the block family and the die; finally, the identified threshold voltage offset bin is used as the index to the offset table 530 in order to determine the threshold voltage offset corresponding to the bin. The memory sub-system controller can then additively apply the identified threshold voltage offset to the base voltage read level in order to perform the requested read operation.

In the illustrative example of FIG. 5, the superblock table 510 maps partition 0 of the superblock 0 to block family 4, which is utilized as the index to the family table 520 in order to determine that die 0 is mapped to bin 3. The latter value is used as the index to the offset table in order to determine the threshold voltage offset values for bin 3.

Figure 6:
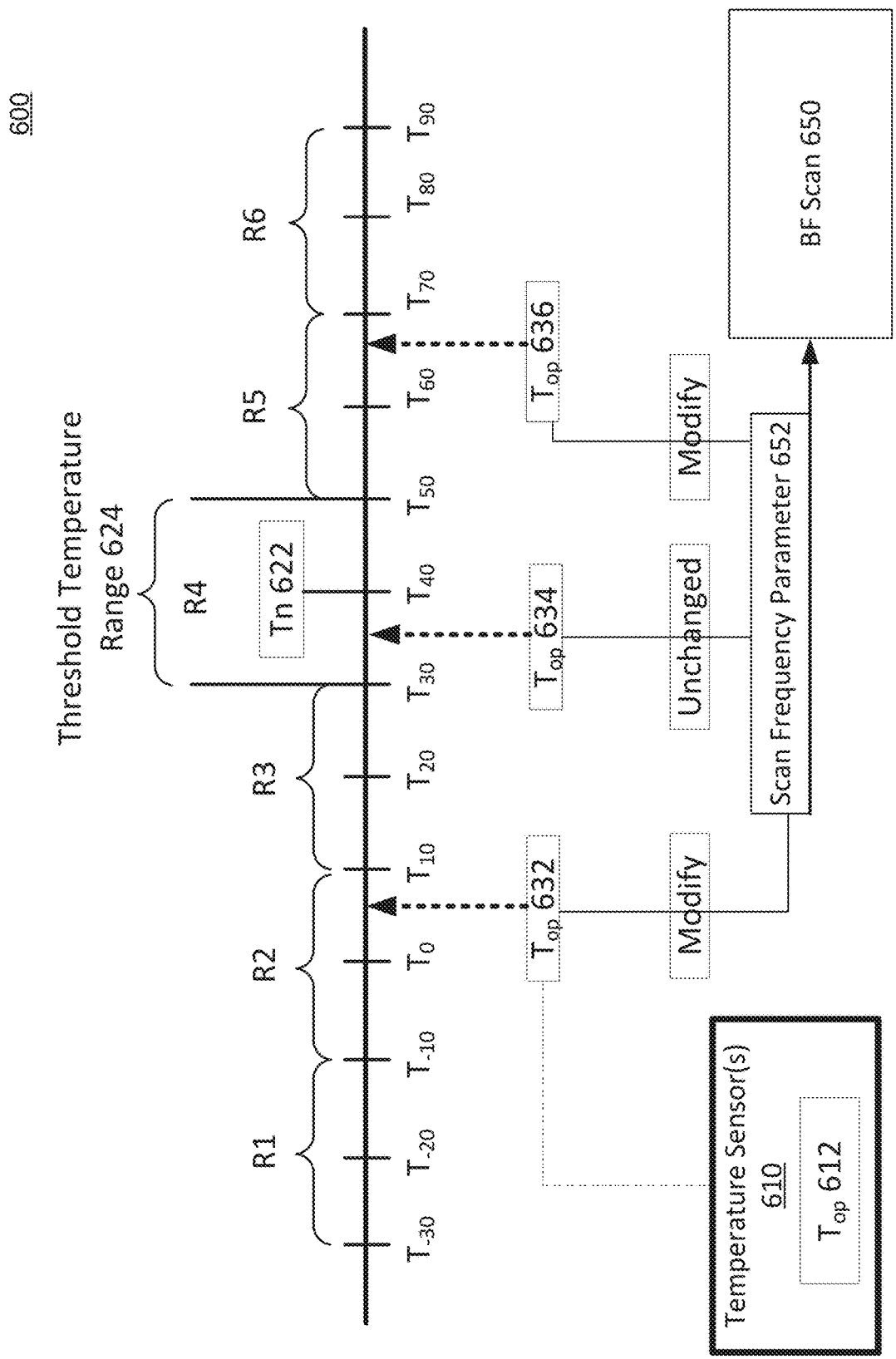
FIG. 6 illustrates an example of charge loss scan operation management based on operating temperature of a memory device, in accordance with embodiments of the disclosure.

FIG. 6 illustrates an example of charge loss scan operation management based on operating temperature of a memory device of memory sub-system 600, in accordance with embodiments of the disclosure. In general, the memory sub-system 200 can correspond to the memory sub-system 110 of FIG. 1. For example, memory sub-system 600 can include memory sub-system controller 115, memory device 130/140, and BF scan manager component 113 of FIG. 1.

In some implementations, the memory sub-system 600 can identify an operating temperature associated with the memory sub-system 600. An operating temperature can be the current temperature at which the memory sub-system 600 is operating. Temperature measurement associated with the memory sub-system 600 can be obtained in several ways. For example, the temperature measurement can include an operating temperature $T_{op}$ 612 from one or more temperature sensors 610 located in and/or around memory device 130/140 and/or temperature measurements from other temperature sensors that are associated with other components of memory sub-system 110 (e.g., controller 115). In some implementations, the temperature sensors 610 can be configured to periodically and at predefined intervals measure the operating temperature $T_{op}$ 612 and to provide an indication of the measured operating temperature $T_{op}$ 612 to the memory sub-system 600. In other implementations, the temperature sensors 610 can measure the operating temperature $T_{op}$ 612 responsive to one or more commands or queries that can be sent by the memory sub-system 600, such as a command to measure operating temperature $T_{op}$ 612. Depending on the embodiment, the current temperature can include a temperature of one or more die, cell, and/or page of the memory device 130/140, an operating temperature of the memory sub-system 600, or an ambient temperature in an area where memory sub-system 600 is located. The temperature measurement can include a moving average of temperature values measured within a window of time. In some examples, the operating temperature can represent an aggregate temperature measured at multiple memory dice, memory pages, memory cells, or memory element at another granularity. For example, the temperature measurement can include values that represent the average of any temperature values across multiple measurements, e.g., different temperature sensors 610, including those positioned at the multiple dice of the memory device 130/140.

Memory sub-system 600 can select, as the threshold temperature, a nominal temperature Tn 622 at which the memory device is expected to operate. The nominal temperature (e.g., T40) can be selected based on, for example, historic data, memory device usage statistics, knowledge database, room temperature, arbitrary value, a hypothesis, etc. For example, a nominal temperature can be selected to be 40° C. In some implementations, a threshold temperature range 624 can be defined, using a threshold starting temperature (e.g., T30) and a threshold ending temperature (e.g., T50), as specified in memory sub-system 600. The threshold temperature range 624 can be defined with respect to the nominal temperature Tn 622, such that Tn 622 is included within the range 624. For example, a threshold temperature range can be defined as 30° C. to 49° C.

In an implementation, the memory sub-system 600 can use a BF scan frequency parameter 652 to periodically perform the BF scan operation 650. The BF scan frequency parameter 652 can be modified to change the frequency of the BF scan operation 650 when necessary. The memory sub-system can define an initial BF scan frequency value for each voltage bin corresponding to the nominal temperature Tn 622, and/or the threshold temperature range 624. The initial BF scan frequency can be defined based on how long a block family stay in each bin on an average (e.g., bin duration). The BF scan is performed more frequently than once per the bin duration, in order to ensure a change in the measured data state metric necessitating a bin change is detected before too much time has passed. For example, if it is determined that a block family stays in bin 0 for two hours, that is, the bin duration is two hours, the initial BF scan frequency can be set to more than once per two hour, or at least twice per the two hours (or, once per hour).

In an implementation, memory sub-system 600 can determine whether the operating temperature of the memory sub-system 600 satisfies a temperature condition. For example, the temperature condition can be defined as the operating temperature being above or below the threshold temperature Tn 622, or, in some examples, outside the threshold temperature range 624. For example, the operating temperature is outside of the threshold temperature range when the operating temperature is below the threshold starting temperature (e.g., T30) or above the threshold ending temperature (e.g., T50). For example, the temperature condition is satisfied when the operating temperature is outside of a 30° C. to 49° C. threshold temperature range. On the other hand, the temperature condition is not satisfied when the operating temperature (e.g., $T_{op}$ 634) is within the threshold temperature range 624. When the temperature condition is not satisfied, the scan frequency parameter 652 is kept unchanged for performing the BF scan 650, as this initial frequency was defined based on the memory device operating within this threshold temperature range 624.

FIG. 6 shows an identified operating temperature $T_{op}$ 632 obtained from temperature sensors 610 at one point in time. For example, the operating temperature $T_{op}$ 632 can be 15° C. Memory sub-system 600 can compare the threshold temperature $T_n$ 622 (e.g., 40° C.) and the identified operating temperature $T_{op}$ 632, and determine that the identified operating temperature $T_{op}$ 632 is below the threshold temperature $T_n$ 622. More particularly, $T_{op}$ 632 is below the threshold starting temperature T30 (e.g., 30° C.). When the operating temperature is below the nominal temperature (or, the starting temperature of threshold temperature range), the memory device loses less charge than when the memory device operates within the nominal temperature range and stays in the voltage bin for a longer duration. Accordingly, the memory sub-system can reduce the BF scan frequency parameter 652.

For example, the BF scan frequency can be modified using a predefined function. For example, the function can be based on temperature deviation of the operating temperature from the nominal temperature. For example, the decrease in BF scan frequency can be proportional to the deviation. The function can be derived based on experimentation, usage data, and other statistics related to impact of temperature variation on SCL. For example, the initial BF scan frequency for bin 0 is defined as once per hour. When the operating temperature $T_{op}$ 632 (e.g., 15° C.) is determined to be below nominal temperature Tn 622 of 40° C. (e.g., by 25° C.), the BF scan frequency parameter can be set to once per 2 hours (e.g., 50% of the initial frequency value). In another example, if $T_{op}$ 632 is −10° C., which deviates from the nominal temperature by 50° C., the BF scan frequency can be set to once per four hours (e.g., 25% of the initial frequency value).

Similarly, memory sub-system 600 can compare the threshold temperature $T_n$ 622 and an identified operating temperature $T_{op}$ 636 to determine that the identified operating temperature $T_{op}$ 636 (e.g., 65° C.) is above the threshold temperature $T_n$ 622 (40° C.), in which case the memory device charge loss is accelerated and necessitates more frequent BF scanning. Accordingly, the memory sub-system can modify the BF scan frequency parameter 652 from the initial BF scan frequency value to an increased scan frequency value, using a predefined function. For example, the BF scan frequency for voltage bin 0 can be increased from once per hour to twice per hour (e.g., by doubling the frequency value).

In some implementation, the memory sub-system 600 can define a number of temperature ranges in addition to the threshold temperature range. For example, the memory sub-system 600 can identify the highest temperature (e.g., T90) and the lowest temperature (e.g., $T_{−30}$) at which the memory device can practically operate. The range between the lowest and highest temperature can be defined as the operating temperature spectrum. The operating temperature spectrum can be divided in a number of temperature regions. For example, FIG. 6 shows the operating temperature spectrum from $T_{−30}$ to $T_{90}$ is divided in 6 regions, R1 to R6. For example, the number of temperature regions can be configurable. Each temperature region can have a predefined range of temperature values, including a start temperature and an end temperature for the respective range. The temperature ranges do not overlap with one another. For example, assuming temperature values are given in whole numbers, predefined temperature ranges can include −30° C. to −9° C., −10° C. to 9° C., 10° C. to 29° C., 30° C. to 49° C. (also defined as the threshold temperature range), 50° C. to 69° C., 70° C. to 89° C., etc. Region R3, for example, can have a starting temperature $T_{10}$ and ending temperature $T_{30}−1$. In some examples, each temperature range (e.g., region) can be of the same size, such that the difference between the start and end temperature is same across each range (e.g., 20° C. in FIG. 6). In other examples, the temperature ranges can be of different sizes (e.g., region R5 can be 15° C., region R6 can be 10° C., etc.). In some examples, the regions below the threshold range 624 can all have the same specified size (e.g., 20° C.), whereas the regions above the threshold range 624 can all have another specified size (e.g., 10° C.). In some examples, the size is configurable, such that the size of the temperature ranges can be modified as necessary.

The memory sub-system 600 can associate each temperature range to a respective scan condition for performing BF scan operation 650 for each voltage bin. In one implementation, the memory sub-system 600 can associate each temperature range to a predefined scan frequency value. Each scan condition corresponding to each temperature range can be derived based on the predefined scan frequency value associated with the respective temperature range. For example, a particular scan condition for a temperature range can be satisfied when a particular time occurs. The occurrence of the particular time can be derived based on the predefined scan frequency value for the temperature range. For example, if the predefined scan frequency value is set to once per hour for a temperature range, then the memory sub-system can determine when one hour has passed from when the last BF scan was performed. When the particular time (e.g., one hour form last scan) occurs, the scan condition can be satisfied. The predefined scan frequency values can be set based on experimentation, or other statistics, and varies based on the associated temperature range. The higher the temperature range, the higher are the frequency values, and the lower the temperature range, the lower are the frequency values. The frequency values can be selected based on the duration of time a block family stays at a voltage bin for that temperature range. For example, region R3 can be associated with a frequency value of once per 2 hours, region R2 can be associated with a frequency value of once per four hours, etc.

The memory sub-system 600 can identify which particular temperature range the identified operating temperature falls within. The memory sub-system can then modify the BF scan frequency parameter 652 according to the predefined scan frequency value corresponding to the particular temperature range where the operating temperature falls within. For example, when it is identified that $T_{op}$ 632 falls within region R2, the frequency parameter 652 can be modified from the initial frequency value to the predefined scan frequency value (e.g., once per four hours) corresponding to region R2.

In an implementation, the memory sub-system can perform BF scan operation 650 when a specified scan condition, corresponding to the particular temperature range, is satisfied. For example, the given scan condition is satisfied when a specified time occurs. In an implementation, the specified time is derived based on the respective scan frequency parameter associated with the particular temperature range. That is, if the frequency value indicates to perform the scan at every one hour, the memory sub-system can determine when one hour has passed from when the last BF scan was performed and indicates that the scan condition is satisfied.

In an implementation, memory sub-system 600 performs the BF scan operation 650 at the modified frequency value corresponding to the frequency parameter 652 by performing read operations using representative blocks of the block family. When the memory sub-system identifies that a data state metric associated with the representative block indicates that a different read offset level is more appropriate, then the calibration process can be performed to change the bin pointer associated with a block family of a die to the next bin. BF scan operation 650 is also used to combine or merge block families as the block families age and the temporal voltage shifts for temporally adjacent block families start to converge. The memory sub-system controller can perform a BF scan to identify active block families that are candidates for combination. The measurements performed to determine whether block families should be merged are done at a more granular level (e.g., the actual voltage shift) than the measurements (e.g., RBER) that are done for the calibration process.

In operation, upon receiving a read command, the memory sub-system controller can identify the block family associated with the block identified by the logical block address (LBA) specified by the read command, identify the threshold voltage offset bin associated with the block family and die on which the block resides, compute the new threshold voltage by additively applying the threshold voltage offset associated with the threshold voltage offset bin to the base read level, and perform the read operation using the new threshold voltage. Each read corresponds to a particular page type and each page type corresponds to certain valleys. For each page read appropriate offsets are applied per valley.

Figure 7:
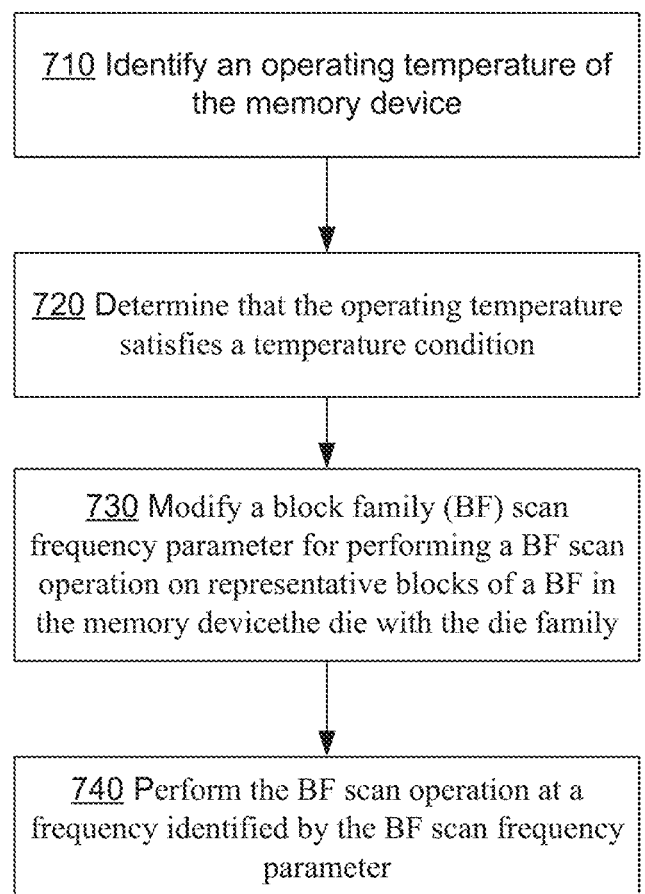
FIG. 7 is a flow diagram of an example method of modifying a block family scan frequency parameter, in accordance with some embodiments of the disclosure.

FIG. 7 is a flow diagram of an example method of modifying a block family scan frequency parameter, in accordance with some embodiments of the disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the BF scan manager component 113 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 710, the processing logic can identify an operating temperature of the memory device. In some examples, the one or more temperature sensors can be used to measure the operating temperature of the memory device.

At operation 720, the processing logic can determine that the operating temperature satisfies a temperature condition. For example, determining that the operating temperature satisfies the temperature condition can include determining that the operating temperature is outside of a threshold temperature range. The threshold temperature range can include a threshold starting temperature and a threshold ending temperature. For example, determining that the operating temperature is outside of the threshold temperature range can include determining that the operating temperature is below the threshold starting temperature or above the threshold ending temperature.

At operation 730, the processing logic can modify a scan frequency parameter for performing a scan operation on representative blocks of a set of blocks of the memory device. In some embodiments, the set of blocks can be represented by a block family. For example, if it is determined that the operating temperature is below the threshold starting temperature, the scan frequency parameter can be modified by decreasing the scan frequency parameter. In another example, if it is determined that the operating temperature is above the threshold ending temperature, the scan frequency parameter can be modified by increasing the scan frequency parameter. In some examples, the scan frequency parameter can be modified by modifying the scan parameter based on a function of operating temperature deviation from the threshold temperature range.

In some examples, the processing logic can associate each temperature range of a plurality of predefined temperature ranges to a respective scan frequency value of a plurality of predefined scan frequency values. The processing logic can identify a particular temperature range of the plurality of predefined temperature ranges where the operating temperature falls within the particular temperature range. The processing logic can modify the scan frequency parameter by setting the scan frequency parameter to a particular scan frequency value of the plurality of predefined scan frequency values. The particular scan frequency value corresponds to the particular temperature range. At operation 740, the processing logic can perform the scan operation at a frequency identified by the scan frequency parameter.

FIG. 8 is a flow diagram of an example method of managing a block family scan operation based on operating temperature of a memory device, in accordance with some embodiments of the disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the BF scan manager component 113 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 810, the processing logic identifies a plurality of temperature ranges. For example, each temperature range includes a starting temperature and an ending temperature. For example, the plurality of temperature ranges do not overlap with one another. In some examples, a size of each temperature range corresponds to a difference between the ending temperature and staring temperature of the respective temperature range. In some examples, the size is configurable. In some examples, the size is same across each of the plurality of temperature ranges. In some examples, the starting temperature and the ending temperature are modifiable by modifying the size of the temperature range.

At operation 820, the processing logic associates each temperature range to a respective scan condition for performing a scan operation on a set of blocks of a memory device. In some embodiments, the set of blocks can be represented by a block family. For example, each scan condition corresponding to each temperature range is based on a scan frequency parameter associated with the respective temperature range.

At operation 830, the processing logic identifies an operating temperature of the memory device. At operation 840, the processing logic determines that the operating temperature is within a particular temperature range of the plurality of temperature ranges.

At operation 850, responsive to determining that a specified scan condition is satisfied, the processing logic performs the BF scan operation, where the specified scan condition corresponds to the particular temperature range. For example, the given scan condition is satisfied when a specified time occurs, where the specified time is derived based on the respective scan frequency parameter.

Figure 9:
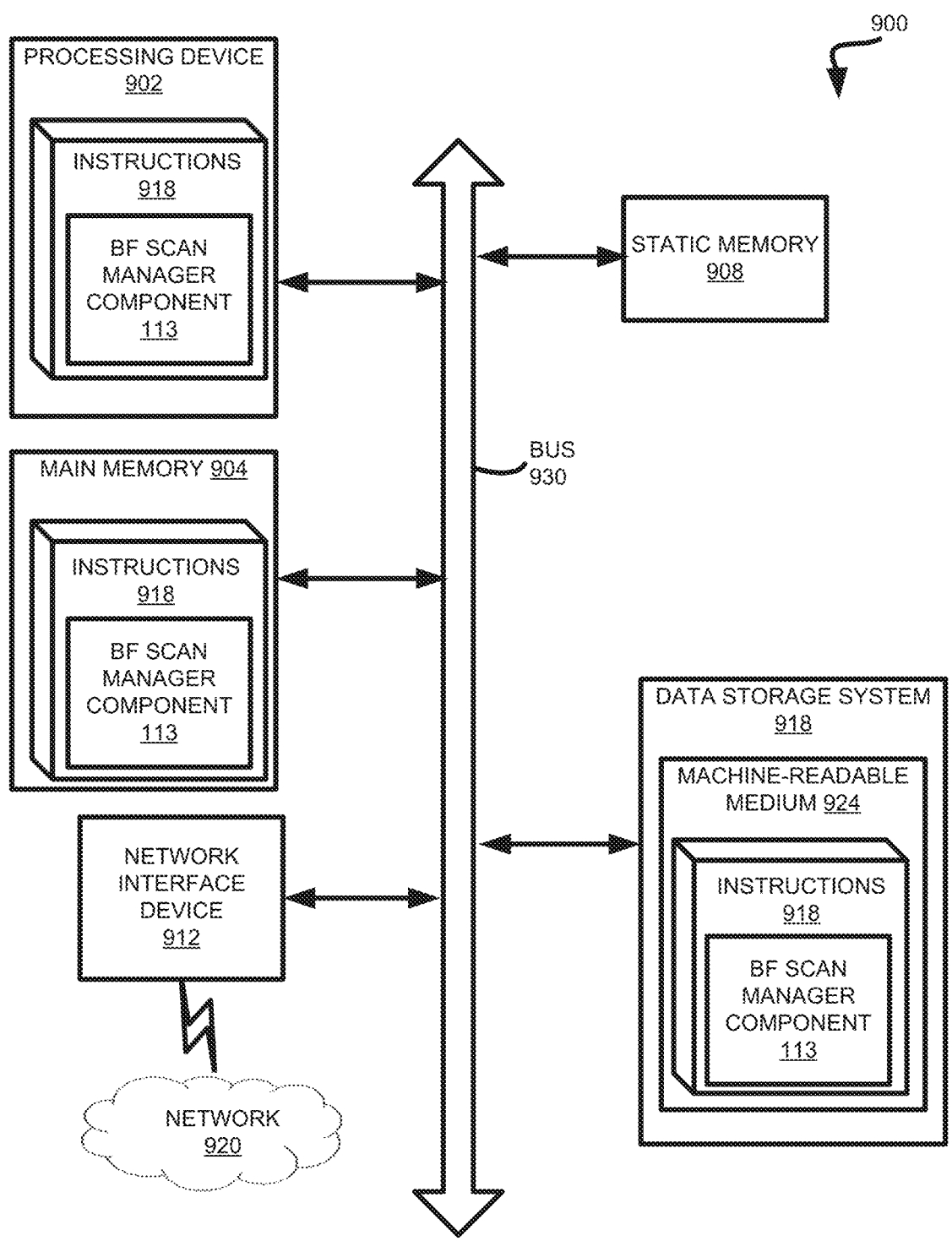
FIG. 9 is a block diagram of an example computer system in which embodiments of the disclosure can operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1 or 2) that includes, is coupled to, or utilizes a memory sub-system (e.g., the memory sub-system 110 of FIG. 1 or 2) or can be used to perform the operations of a controller (e.g., to execute an operating system to perform operations corresponding to the BF scan manager component 113 of FIG. 1 or 2). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 810 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 928 for performing the operations and steps discussed herein. The computer system 900 can further include a network interface device 912 to communicate over the network 920.

The data storage system 918 can include a machine-readable storage medium 924 (also known as a computer-readable medium) on which is stored one or more sets of instructions 928 or software embodying any one or more of the methodologies or functions described herein. The instructions 928 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIG. 1 or 2.

In one embodiment, the instructions 928 include instructions to implement functionality corresponding to the BF scan manager component 113 of FIG. 1 or 2. While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment" or "one embodiment" or "an implementation" or "one implementation" or the like throughout may or may not mean the same embodiment or implementation. One or more embodiments or implementations described herein may be combined in a particular embodiment or implementation. The terms "first," "second," "third," "fourth," etc. as used herein are meant as labels to distinguish among different elements and may not necessarily have an ordinal meaning according to their numerical designation.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device; and
   a processing device, operatively coupled to the memory device, to perform operations comprising:
      identifying an operating temperature of the memory device;
      identifying, for a set of blocks of the memory device, a scan frequency corresponding to the operating temperature, wherein the scan frequency exceeds one scan operation per a period of time in which the set of blocks stays associated with a certain threshold voltage offset;
      responsive to determining that the operating temperature exceeds a threshold temperature, increasing the scan frequency; and performing a scan operation with respect to a representative block of the set of blocks of the memory device at the scan frequency.

2. The system of claim 1, further comprising:
associating each temperature range of a plurality of predefined temperature ranges to a respective scan frequency value of a plurality of predefined scan frequency values;
identifying a particular temperature range of the plurality of predefined temperature ranges, wherein the operating temperature falls within the particular temperature range; and
setting the scan frequency to a particular scan frequency value of the plurality of predefined scan frequency values, wherein the particular scan frequency value corresponds to the particular temperature range.

3. The system of claim 1, further comprising one or more temperature sensors to measure the operating temperature of the memory device.

4. The system of claim 1, wherein the operations further comprise:
responsive to determining that the operating temperature is below a second threshold temperature, decreasing the scan frequency.

5. The system of claim 1, wherein increasing the scan frequency is performed based on a predefined function.

6. The system of claim 1, wherein the set of blocks has been programmed within a certain time window.

7. The system of claim 1, wherein the set of blocks has been programmed within a certain temperature window.

8. A method, comprising:
identifying, by a processing device, a plurality of temperature ranges, wherein each temperature range corresponds to a respective predefined threshold voltage offset;
associating each temperature range to a respective scan frequency for performing a scan operation on a set of blocks of a memory device, wherein the respective scan frequency exceeds one scan operation per a period of time in which the set of blocks stays associated with a certain threshold voltage offset;
identifying an operating temperature of the memory device;
determining that the operating temperature is within a particular temperature range of the plurality of temperature ranges; and
performing the scan operation at a scan frequency corresponding to the particular temperature range.

9. The method of claim 8, wherein the plurality of temperature ranges do not overlap with each other.

10. The method of claim 8, wherein a size of each temperature range corresponds to a difference between an ending temperature and a starting temperature of the respective temperature range, and wherein the size is configurable.

11. The method of claim 10, wherein the plurality of temperature ranges have equal respective sizes.

12. A method, comprising:
identifying, by a processing device, an operating temperature of a memory device;
identifying, for a set of blocks of the memory device, a scan frequency corresponding to the operating temperature, wherein the scan frequency exceeds one scan operation per a period of time in which the set of blocks stays associated with a certain threshold voltage offset;
responsive to determining that the operating temperature exceeds a threshold temperature, increasing the scan frequency; and
performing a scan operation with respect to a representative block of the set of blocks of the memory device at the scan frequency.

13. The method of claim 12, further comprising:
associating each temperature range of a plurality of predefined temperature ranges to a respective scan frequency value of a plurality of predefined scan frequency values;
identifying a particular temperature range of the plurality of predefined temperature ranges, wherein the operating temperature falls within the particular temperature range; and
setting the scan frequency to a particular scan frequency value of the plurality of predefined scan frequency values, wherein the particular scan frequency value corresponds to the particular temperature range.

14. The method of claim 12, further comprising:
responsive to determining that the operating temperature is below a second threshold temperature, decreasing the scan frequency.

15. The method of claim 12, wherein increasing the scan frequency is performed based on a predefined function.

16. The method of claim 12, wherein the set of blocks has been programmed within a certain time window.

17. The method of claim 12, wherein the set of blocks has been programmed within a certain temperature window.

* * * * *